(12) United States Patent
Gron, Jr. et al.

(10) Patent No.: US 7,128,992 B2
(45) Date of Patent: Oct. 31, 2006

(54) DUAL PUMP FUEL CELL TEMPERATURE MANAGEMENT SYSTEM

(75) Inventors: G. Michael Gron, Jr., Granby, CT (US); Parthasarathy Seshadri, Weatogue, CT (US); Matthew P. Wilson, Groton, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 196 days.

(21) Appl. No.: 11/016,260

(22) Filed: Dec. 16, 2004

(65) Prior Publication Data

US 2006/0134481 A1 Jun. 22, 2006

(51) Int. Cl.
*H01M 8/04* (2006.01)
(52) U.S. Cl. .......................................... 429/26; 429/17
(58) Field of Classification Search .................. 429/17, 429/26
See application file for complete search history.

(56) References Cited

U.S. PATENT DOCUMENTS 6,013,385 A * 1/2000 DuBose ....................... 429/17
6,562,503 B1 * 5/2003 Grasso et al. ................. 429/26
6,656,622 B1 * 12/2003 Grasso ........................ 429/26
6,902,840 B1 * 6/2005 Blanchet et al. .............. 429/34
2005/0117796 A1 6/2005 Matsui et al.

* cited by examiner

*Primary Examiner*—Mark Ruthkosky
(74) *Attorney, Agent, or Firm*—M. P. Williams

(57) ABSTRACT

The outflow of coolers or water transport plates of a fuel cell stack (15) is fed to the inlet of a gas/liquid separator (12), the liquid output of which is connected through a primary pump (11*a*) to a liquid accumulator (21). A secondary pump (44) connected to the liquid output (20) of the liquid accumulator is fed to the principal inlet (31) of an eductor (32), the secondary inlet being connected to the gas output of the gas/liquid separator. The outlet (37) of the eductor is fed through a conduit (38) to a point below liquid level in the liquid accumulator. Thus, failure of the secondary pump (44) will not cause cavitation of the primary pump (11*a*) through the eductor so that coolant will continue to flow through the fuel cell stack. A demineralizer (26) is fed through a pressure reducing orifice (25) from the outlet of the secondary pump.

2 Claims, 2 Drawing Sheets

DUAL PUMP FUEL CELL TEMPERATURE MANAGEMENT SYSTEM

TECHNICAL FIELD

This invention relates to a temperature management system having two coolant pumps, one for principal flow and the other for an air separator eductor, with an anti-cavitation feature.

BACKGROUND ART

In fuel cell power plants, it is necessary to cool the fuel cell, either by means of porous water transport plates which allow diffusion of both water and reactant gases therethrough, or by means of coolant plates, or both. In fuel cell power plants employing proton exchange membrane (PEM) fuel cells, compactness and minimal parasitic power suggest the use of water transport plates.

It is also known to use a separator to separate air and frothy water from the main coolant supply prior to returning the coolant to a pump, in order to avoid pump cavitation. One form is illustrated in FIG. 1. Therein, the primary coolant pump 11 draws water through a separator 12 from a conduit 13 connected to the coolant outlet 14 of a fuel cell stack assembly 15. The coolant inlet 18 is connected by a conduit 19 to a coolant outlet 20 of a liquid accumulator 21, which has a conventional vent 29.

The outflow of the coolant pump 11 is provided by conduit 23 to the accumulator 21. Pump outflow is also provided over a conduit 24 through a pressure reducing orifice 25 to a demineralizer 26, so that some fraction of the circulating water is demineralized (has ions removed therefrom), continuously. The coolant water outflow of the pump 11 is also provided over a conduit 30 to the primary inlet 31 of an eductor (ejector) 32. The secondary inlet 33 of the eductor is connected to the separator 12, and serves to suction off frothy water and air from the separator 12. The outlet of the eductor 37 is connected by a conduit 38 to the accumulator 21.

Problems with this prior art system arise due to the difficulty of matching the water flow requirements of the pump 11 with the inlet pressure requirements of the eductor 32. It is essential that the eductor inlet pressure be properly selected to provide the desired function of clearing the separator 12. It is also essential that the pump 11 provide the proper water flow at a desired pressure at the water outlet 14 of the fuel cell stack 15.

DISCLOSURE OF THE INVENTION

Objects of the invention include: providing a temperature management system for a fuel cell power plant which provides proper water flow and proper clearance of a water/air separator; enhancing and expediting the initial fill of a fuel cell stack assembly; improved priming of a fuel cell stack coolant pump; optimizing eductor operation in a fuel cell stack cooling system; improved coolant demineralizer operation in a fuel cell stack; and improved performance of the water temperature management system of a fuel cell power plant.

According to the present invention, a fuel cell power plant includes two pumps, one that is selected simply for the correct flow of coolant from the coolant outlet of a fuel cell power plant to an accumulator, and one that is selected only for the proper pressure at the primary inlet of an eductor that clears air and frothy water from an air/water separator.

According further to the invention, the principal outlet of the eductor is ducted below liquid level in the accumulator, thereby to avoid the occurrence of air being drawn from the eductor outlet to the secondary inlet of the eductor in the event that the eductor pump fails, whereby coolant can be continued to be circulated without cavitation of the principal coolant pump.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 2:
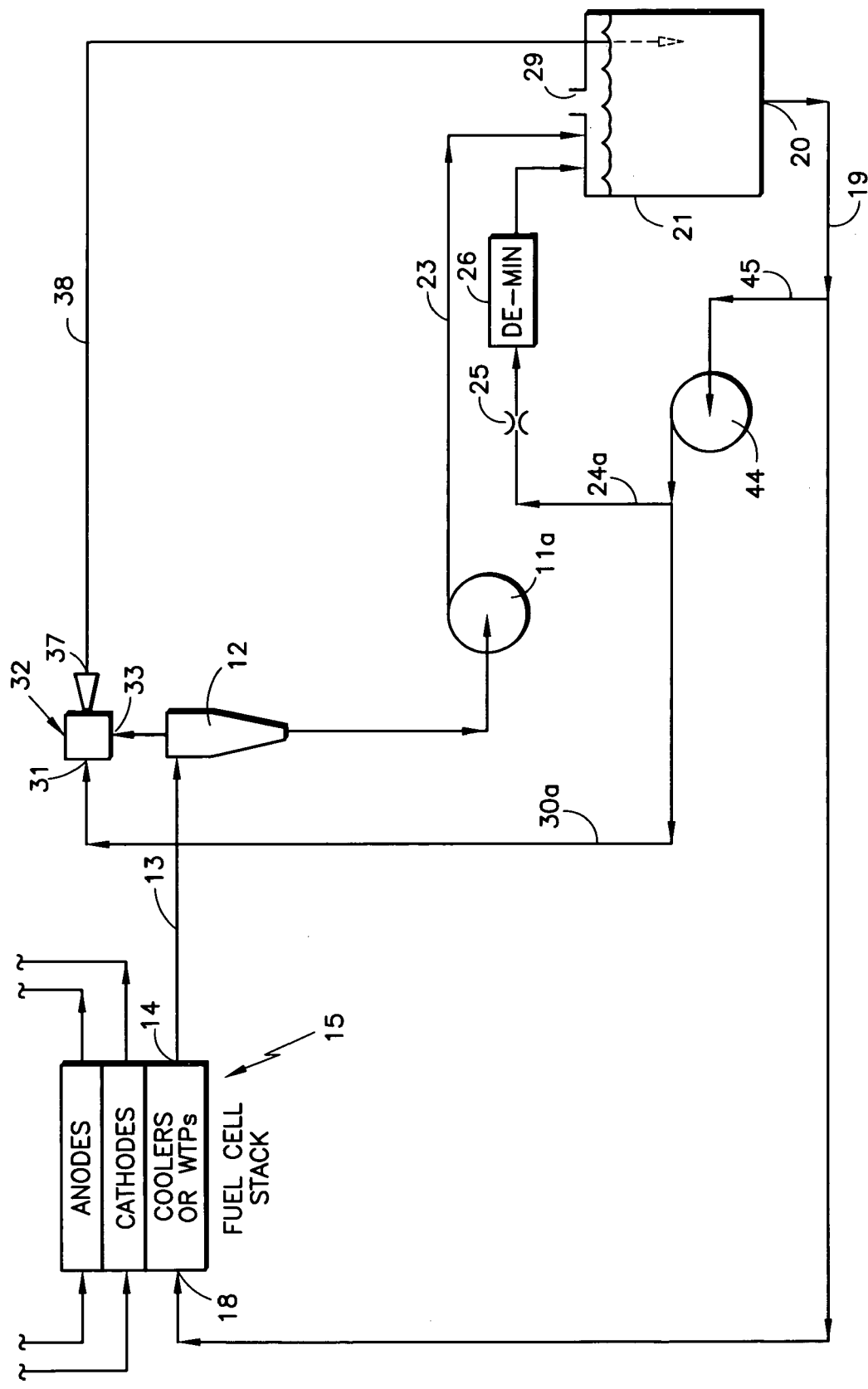
FIG. 2 is a simplified, stylized schematic illustration of a fuel cell power plant temperature management system employing the invention.

In FIG. 2, in accordance with the invention, a secondary pump 44 receives water over conduit 45, 19 from the accumulator 21. The coolant flow is provided over a conduit 30a to the primary inlet 31 of the eductor 32. In accordance with this aspect of the invention, the main pump 11a can now be selected simply to provide the desired flow of coolant, while the secondary pump 44 can be selected simply to provide coolant at the desired pressure to the inlet 31 of the eductor 32. The primary pump 11 provides low pressure coolant at a high flow rate, which is particularly advantageous for drawing sufficient flow of demineralized water through the fuel cell stack 15.

In the embodiment of FIG. 2, the demineralizer 26 is also provided coolant from the secondary pump 44, through the orifice 25. The secondary pump 44 provides coolant at a high pressure but low flow rate, which enhances the processing of contaminated coolant through the demineralizer 26. However, if desired, the demineralizer 26 may be operated off the conduit 23 instead of being operated off the conduit 30a.

Figure 1:
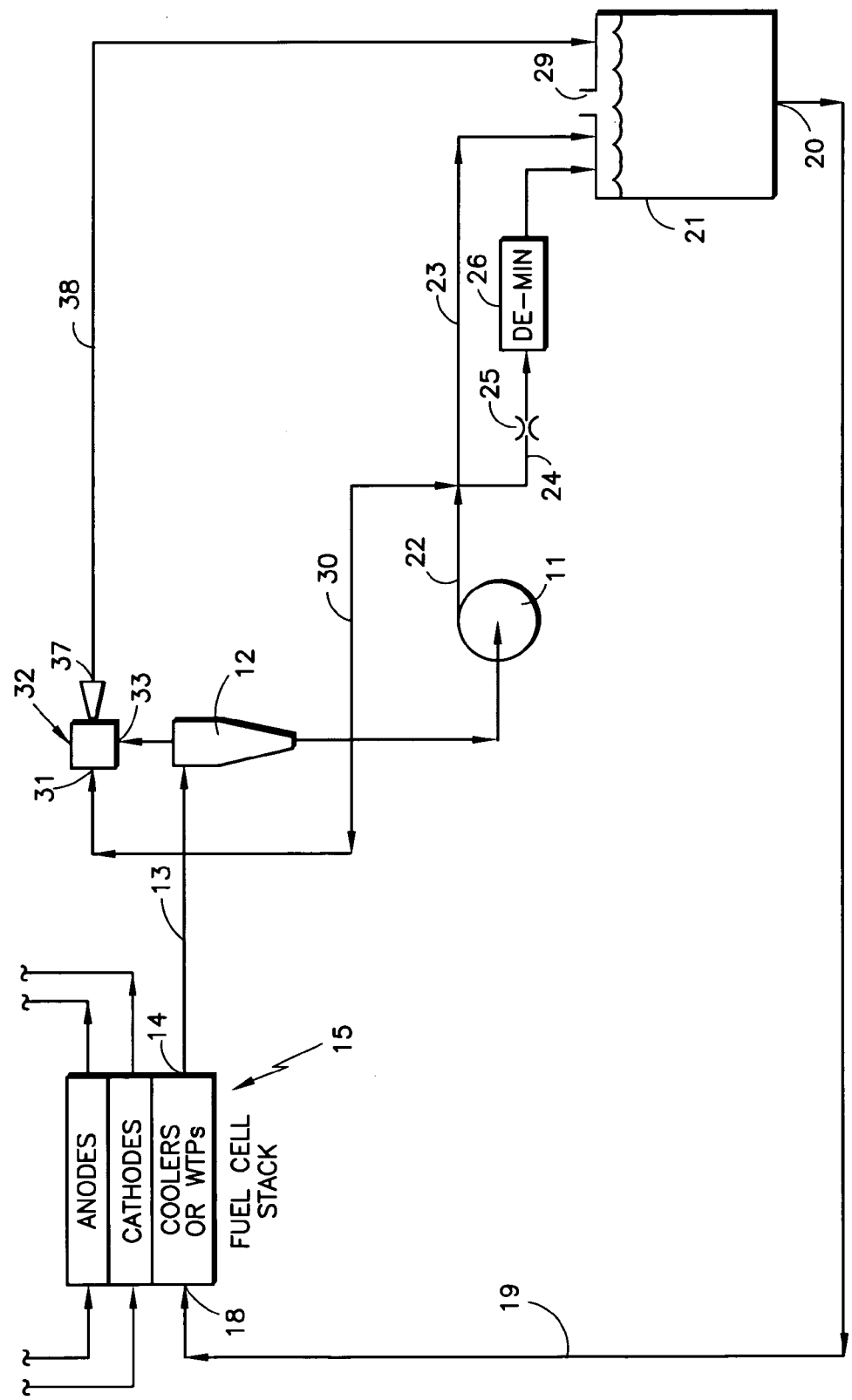
FIG. 1 is a simplified, stylized schematic illustration of a fuel cell power plant temperature management system known to the prior art.

The secondary pump 44 (FIG. 2) is likely to be a light duty pump. In the event that it should fail, the eductor 32 would then act like a tee fitting, drawing air through the eductor outlet 37 from above the liquid level in the accumulator 21. In the prior art, as visualized in FIG. 1, the conduit 38 terminates above the liquid level in the accumulator 21. However, according to the invention, the conduit 38 from the outlet 37 of the eductor is terminated well into the accumulator 21 so as to always be beneath the liquid level thereof. Therefore, should the secondary pump 44 fail, the flow through the separator 12 in response to the main pump 11a would simply draw water from the accumulator 21, along the conduit 38, backwardly through the eductor, and from the eductor's secondary inlet 33 to the separator 12. In this configuration, air will not be drawn into the separator and so the main pump 11a will not cavitate as a result of failure of the secondary pump 44.

Therefore, even though there is an imperfect separation of air and froth due to inoperability of the eductor when the secondary pump 44 fails, the primary pump will not cavitate, and will be able to continue to flow coolant to the fuel cell stack 15 for an extended period of time. This is particularly important in a vehicle which may be able to complete an itinerary and return to its destination before failure of the secondary pump 44 will result in cavitation of the main pump 11a.

The invention assists the initial filling of the fuel cell stack assembly with coolant during startup, because the secondary pump 44 not only drives the ejector to withdraw air from the stacks, it also helps to prime the primary pump 11a at startup. The dual pump system of the invention allows the eductor 32 to operate at low coolant flows and high pressure independently of the primary pump, thus optimizing eductor operation. The invention permits high pressure, low flow rate coolant to the demineralizer 26, thus improving the decontamination of coolant.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell power plant having a temperature management system, comprising:

a fuel cell stack including cooling devices selected from cooler plates interspersed between at least some of the fuel cells in the stack and water transport plates in some or all of the fuel cells, and having a coolant outlet passing coolant from said cooling devices;

a liquid/gas separator having an inlet connected to the coolant outlet of said fuel cell stack;

a main pump having an inlet connected to a liquid outlet of said gas/liquid separator;

a liquid accumulator receiving coolant outflow of said main pump;

a secondary pump having an inlet connected to a liquid outlet of said liquid accumulator;

an eductor, a principal inlet of which is connected to an outflow of said secondary pump and a secondary inlet of which is connected to the gas outlet of said gas/liquid separator, outflow of said eductor being conducted to said liquid accumulator.

2. A power plant according to claim 1 wherein:

the outflow of said eductor is conducted to a point below liquid level within said liquid accumulator.

* * * * *